(12) United States Patent
Lin

(10) Patent No.: US 12,127,108 B2
(45) Date of Patent: Oct. 22, 2024

(54) ENHANCEMENTS ON USER EQUIPMENT (UE) HANDLING IN A LIMITED SERVICE STATE OVER NON-THIRD GENERATION PARTNERSHIP PROJECT (3GPP) ACCESS

(71) Applicant: MEDIATEK INC., Hsinchu (TW)

(72) Inventor: Yuan-Chieh Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 352 days.

(21) Appl. No.: 17/698,496

(22) Filed: Mar. 18, 2022

(65) Prior Publication Data

US 2022/0369216 A1    Nov. 17, 2022

Related U.S. Application Data

(60) Provisional application No. 63/187,444, filed on May 12, 2021.

(51) Int. Cl.
*H04W 48/18* (2009.01)
*H04W 12/08* (2021.01)
*H04W 60/00* (2009.01)

(52) U.S. Cl.
CPC .......... *H04W 48/18* (2013.01); *H04W 12/08* (2013.01); *H04W 60/00* (2013.01)

(58) Field of Classification Search
CPC ..... H04W 48/02; H04W 48/18; H04W 12/08; H04W 60/00; H04W 60/04; H04W 60/06; H04W 88/06

See application file for complete search history.

(56) References Cited

U.S. PATENT DOCUMENTS

| | | | | |
|---|---|---|---|---|
| 10,880,802 | B1* | 12/2020 | Bakker | H04W 60/00 |
| 2021/0258857 | A1* | 8/2021 | Won | H04W 48/18 |
| 2023/0080836 | A1* | 3/2023 | Vahidi Mazinani | H04W 60/06 |
| | | | | 455/435.1 |
| 2024/0064847 | A1* | 2/2024 | Tiwari | H04W 76/20 |

FOREIGN PATENT DOCUMENTS

WO    2019194473 A1    10/2019

OTHER PUBLICATIONS

NPL (3GPP TS 24.502 V17.2.0, dated Mar. 2021) (Year: 2021).*

(Continued)

*Primary Examiner* — Siu M Lee
(74) *Attorney, Agent, or Firm* — McClure, Qualey & Rodack, LLP

(57) ABSTRACT

A method for enhancing User Equipment (UE) handling in a limited service state over non-Third Generation Partnership Project (non-3GPP) access is provided. A UE sends a REGISTRATION REQUEST message or a SERVICE REQUEST message to a Public Land Mobile Network (PLMN) over non-3GPP access. The UE receives a REGISTRATION REJECT message or a SERVICE REJECT message from the PLMN over non-3GPP access. In particular, the REGISTRATION REJECT message or the SERVICE REJECT message indicates serving network not authorized. In response to the reception of the REGISTRATION REJECT message or the SERVICE REJECT message which indicates serving network not authorized, the UE enters a limited service state and performs a non-3GPP access network selection.

14 Claims, 6 Drawing Sheets

(56) References Cited

OTHER PUBLICATIONS

Chinese language office action dated Dec. 21, 2022, issued in application No. TW 111114425.
3rd Generation Partnership Project; "3GPP TS 24.501 V17.2.1; 3rd Generation Partnership Project; Technical Specification Group Core Network and Terminals; Non-Access-Stratum (NAS) protocol for 5G System (5GS); Stage 3; (Release 17);" Apr. 2021; pp. 1-757.
3rd Generation Partnership Project; "3GPP TS 24.502 V17.2.0; 3rd Generation Partnership Project; Technical Specification Group Core Network and Terminals; Access to the 3GPP 5G Core Network (5GCN) via Non-3GPP Access Networks (N3AN); Stage 3 (Release 17);" Apr. 2021; pp. 1-89.
Chinese language office action dated May 16, 2024, issued in application No. TW 111114425.

* cited by examiner

ENHANCEMENTS ON USER EQUIPMENT (UE) HANDLING IN A LIMITED SERVICE STATE OVER NON-THIRD GENERATION PARTNERSHIP PROJECT (3GPP) ACCESS

CROSS REFERENCE TO RELATED APPLICATIONS

This application claims priority under 35 U.S.C. § 119 from U.S. Provisional Application No. 63/187,444, entitled "LIMITED-SERVICE state and network selection for non-3GPP access", filed on May 12, 2021, the subject matter of which is incorporated herein by reference.

BACKGROUND OF THE APPLICATION

Field of the Application

The application generally relates to mobile communications, and more particularly, to enhancements on User Equipment (UE) handling in a limited service state over non-Third Generation Partnership Project (non-3GPP) access.

Description of the Related Art

In a typical mobile communication environment, a User Equipment (UE) (also called Mobile Station (MS)), such as a mobile telephone (also known as a cellular or cell phone), or a tablet Personal Computer (PC) with wireless communications capability, may communicate voice and/or data signals with one or more service networks. The wireless communications between the UE and the service networks may be performed using various Radio Access Technologies (RATs), including RATs specified by the Third Generation Partnership Project (3GPP) (referred to herein as 3GPP RATs) and RATs not specified by 3GPP (referred to herein as non-3GPP RATs).

For example, the non-3GPP RATs may include Wireless-Fidelity (Wi-Fi) technology, Bluetooth (BT) technology, Zigbee technology, wireline technology, and others. The 3GPP RATs may include Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Long Term Evolution (LTE) technology, TD-LTE technology, LTE-Advanced (LTE-A) technology, New Radio (NR) technology, etc. In particular, GSM/GPRS/EDGE technology is also called 2G technology; WCDMA/CDMA-2000/TD-SCDMA technology is also called 3G technology; LTE/LTE-A/TD-LTE technology is also called 4G technology; and NR technology is also called 5G technology.

To an increasing extent, most UEs may support multiple RATs to provide users with more flexible mobile communications at all times. For example, a UE may support one or more 3GPP RATs and a non-3GPP RAT, wherein the non-3GPP RAT may provide better service quality in indoor environments than the 3GPP RATs, while the 3GPP RATs may provide better service quality in outdoor environments than the non-3GPP RAT.

According to the 3GPP specifications and/or requirements in compliance with the 5G NR technology, a UE which is registered/registering to a roaming Public Land Mobile Network (PLMN) via non-3GPP access should enter the PLMN-SEARCH sub state and perform 3GPP access PLMN selection procedure when it is unable to obtain normal services from the PLMN over non-3GPP access. However, the PLMN-SEARCH substrate is not applicable for non-3GPP access scenarios, and the 3GPP access PLMN selection procedure is also not applicable for non-3GPP access scenarios. As a result, erroneous UE behaviors may occur in cases where the UE is unable to obtain normal services from a PLMN over non-3GPP access.

BRIEF SUMMARY OF THE APPLICATION

In one aspect of the application, a method executed by a User Equipment (UE) is provided. The method comprises the following steps: sending a REGISTRATION REQUEST message or a SERVICE REQUEST message to a Public Land Mobile Network (PLMN) over non-Third Generation Partnership Project (non-3GPP) access; receiving a REGISTRATION REJECT message or a SERVICE REJECT message from the PLMN over non-3GPP access, wherein the REGISTRATION REJECT message or the SERVICE REJECT message indicates serving network not authorized; and entering a limited service state and performing a non-3GPP access network selection in response to the reception of the REGISTRATION REJECT message or the SERVICE REJECT message which indicates serving network not authorized.

In another aspect of the application, a UE comprising a wireless transceiver and a controller is provided. The wireless transceiver is configured to perform wireless transmission and reception to and from a PLMN over non-3GPP access. The controller is coupled to the wireless transceiver, and configured to perform the following using the wireless transceiver: sending a REGISTRATION REQUEST message or a SERVICE REQUEST message to the PLMN over non-3GPP access; receiving a REGISTRATION REJECT message or a SERVICE REJECT message from the PLMN over non-3GPP access, wherein the REGISTRATION REJECT message or the SERVICE REJECT message indicates serving network not authorized; and entering a limited service state and performing a non-3GPP access network selection in response to the reception of the REGISTRATION REJECT message or the SERVICE REJECT message which indicates serving network not authorized.

In one example, the REGISTRATION REJECT message or the SERVICE REJECT message comprises a 5G Mobility Management (5GMM) cause value indicating serving network not authorized. The 5GMM cause value may be 73.

In one example, the limited service state is a 5GMM-DEREGISTERED.LIMITED-SERVICE state in which the UE is able to perform the non-3GPP access network selection.

In one example, the non-3GPP access network selection is a PLMN selection procedure using trusted non-3GPP access, or a PLMN selection procedure using wireline access, or a Non-3GPP Access Network (N3AN) node selection procedure.

In one example, the UE further updates a forbidden PLMN list by storing a PLMN identity of the PLMN in the forbidden PLMN list which is a list of forbidden PLMNs for non-3GPP access to 5G Core Network (CN). The non-3GPP access network selection is then performed using the updated forbidden PLMN list.

In one example, the PLMN is a roaming PLMN.

In one example, the REGISTRATION REQUEST comprises a 5G System (5GS) registration type indicates initial registration, mobility registration updating, or periodic registration updating.

Other aspects and features of the present application will become apparent to those with ordinary skill in the art upon review of the following descriptions of specific embodiments of the methods and apparatuses for enhancing UE handling in a limited service state over non-3GPP access.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
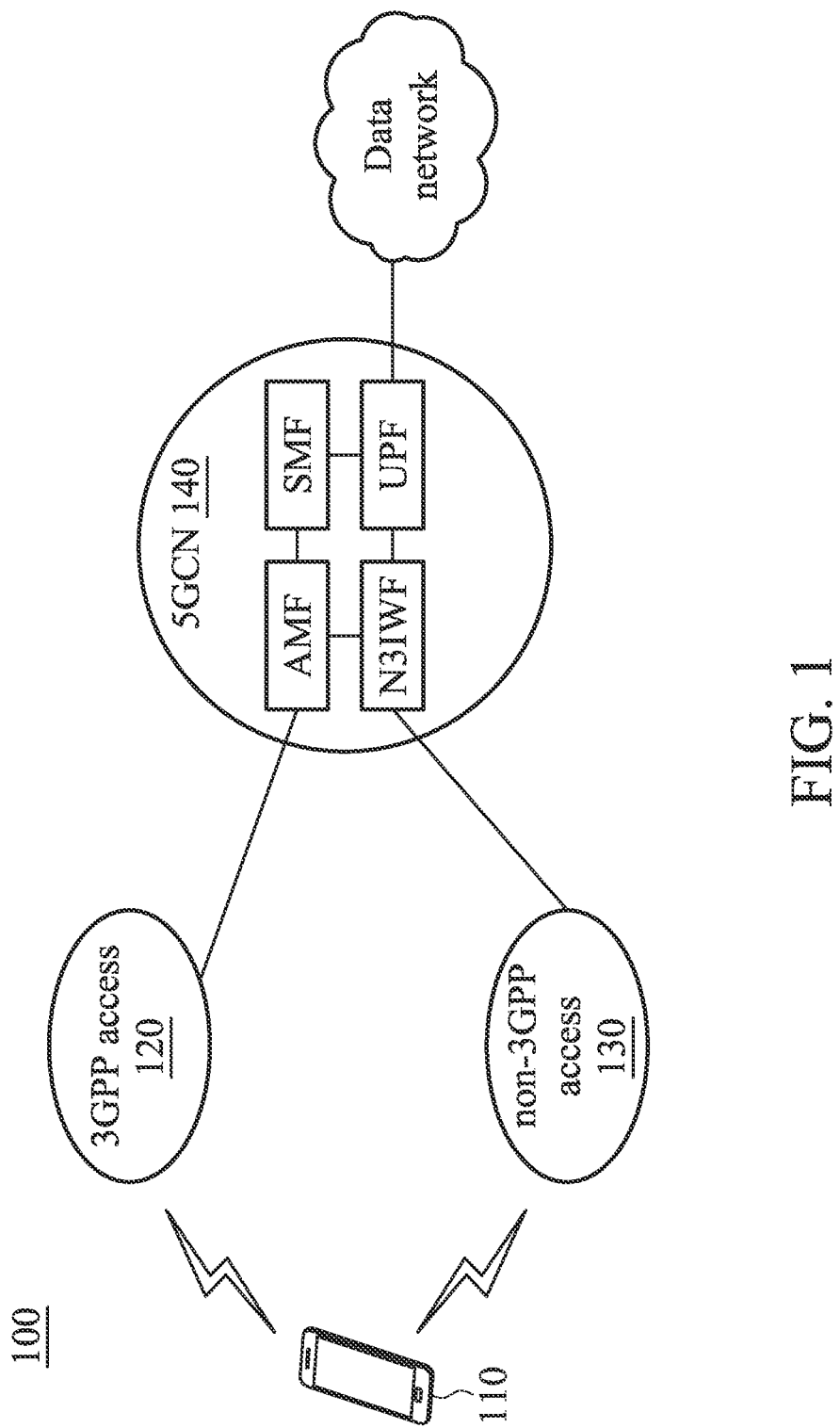
FIG. 1 is a block diagram of a mobile communication environment according to an embodiment of the application.

FIG. 1 is a block diagram of a mobile communication environment according to an embodiment of the application.

The mobile communication environment 100 includes a UE 110, a 3GPP access 120, a non-3GPP access 130, and a 3GPP core network which is exemplified by a 5G Core Network (5GCN) 140.

The UE 110 may be a feature phone, a smartphone, a panel Personal Computer (PC), a laptop computer, a Machine Type Communication (MTC) device, or any mobile communication device supporting the RATs utilized by the 3GPP access 120, the non-3GPP access 130, and the 5GCN 140.

The UE 110 may be wirelessly connected to the 5GCN 140 via the 3GPP access 120 and/or the non-3GPP access 130. For example, the UE 110 may communicate with the 5GCN 140 over the 3GPP access 120 and/or the non-3GPP access 130 to obtain mobile services (e.g., voice and/or data services).

The 3GPP access 120 may refer to an access network utilizing one of the RATs specified by 3GPP. For example, the 3GPP access 120 may include a GSM EDGE Radio Access Network (GERAN), Universal Terrestrial Radio Access Network (UTRAN), Evolved UTRAN (E-UTRAN), or Next Generation Radio Access Network (NG-RAN).

In one embodiment, the 3GPP access 120 may include a GERAN if the utilized RAT is the GSM/EDGE/GPRS technology, and the GERAN may include at least a Base Transceiver Station (BTS) and a Base Station Controller (BSC).

In one embodiment, the 3GPP access 120 may include a UTRAN if the utilized RAT is the WCDMA technology, and the UTRAN may include at least one NodeB (NB).

In one embodiment, the 3GPP access 120 may include an E-UTRAN if the utilized RAT is the LTE/LTE-A/TD-LTE technology, and the E-UTRAN may include at least one evolved NodeB (eNB) (e.g., macro eNB, femto eNB, or pico eNB).

In one embodiment, the 3GPP access 120 may include an NG-RAN if the utilized RAT is the 5G NR technology, and the NG-RAN may include one or more gNBs. Each gNB may further include one or more Transmission Reception Points (TRPs), and each gNB or TRP may be referred to as a 5G cellular station. Some gNB functions may be distributed across different TRPs, while others may be centralized, leaving the flexibility and scope of specific deployments to fulfill the requirements for specific cases.

The non-3GPP access 130 may refer to an access network utilizing one RAT not specified by 3GPP. For example, the non-3GPP access 130 may include a Wireless-Fidelity (Wi-Fi) network, a WiMAX network, a CDMA network, or a fixed network (e.g., a Digital Subscriber Line (DSL) network).

Each of the 3GPP access 120 and the non-3GPP access 130 is capable of providing the functions of processing radio signals, terminating radio protocols, and connecting the UE 110 with the 5GCN 140, while the 5GCN 140 is responsible for performing mobility management, network-side authentication, and interfaces with a public/external data network (e.g., the Internet). In one example, the 5GCN 140 may belong to a roaming Public Land Mobile Network (PLMN).

The 5GCN 140 may also be called a Next Generation Core Network (NG-CN) in the 5G NR technology, and it may support various network functions, including an Access and Mobility Management Function (AMF), a Session Management Function (SMF), a User Plane Function (UPF), a Policy Control Function (PCF), an Application Function (AF), an Authentication Server Function (AUSF), and a Non-3GPP Inter-Working Function (N3IWF), wherein each network function may be implemented as a network element on dedicated hardware, or as a software instance running on dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs. The N3IWF may enable the UE 110 to attach to the 5GCN 140 either via trusted non-3GPP access or via untrusted non-3GPP access.

In accordance with one novel aspect, the UE 110 is allowed to enter the limited service state (e.g., 5GMM-DEREGISTERED.LIMITED-SERVICE state) and perform the non-3GPP access network selection as defined in 3GPP TS 24.502, when it is unable to obtain normal services from the 5GCN 140 over the non-3GPP access 130 due to receiving a 5G Mobility Management (5GMM) cause value indicating that the UE subscription in use is not allowed to be operated in the PLMN, or the UE subscription includes roaming service but the UE is not in the appropriate tracking area, or the serving network fails to be authorized by the UE's home network. Advantageously, the UE 110 is able to enter the correct state in which it is allowed to perform the non-3GPP access network selection to obtain normal service from a PLMN over non-3GPP access.

It should be understood that the 5GCN 140 depicted in FIG. 1 is for illustrative purposes only and is not intended to limit the scope of the application. For example, the UE 110 may be wirelessly connected to other 3GPP core networks (e.g., a future evolution of the 5GCN, such as 6GCN, and 7GCN, etc.) over the non-3GPP access 130 and apply the method of the present application.

Figure 2:
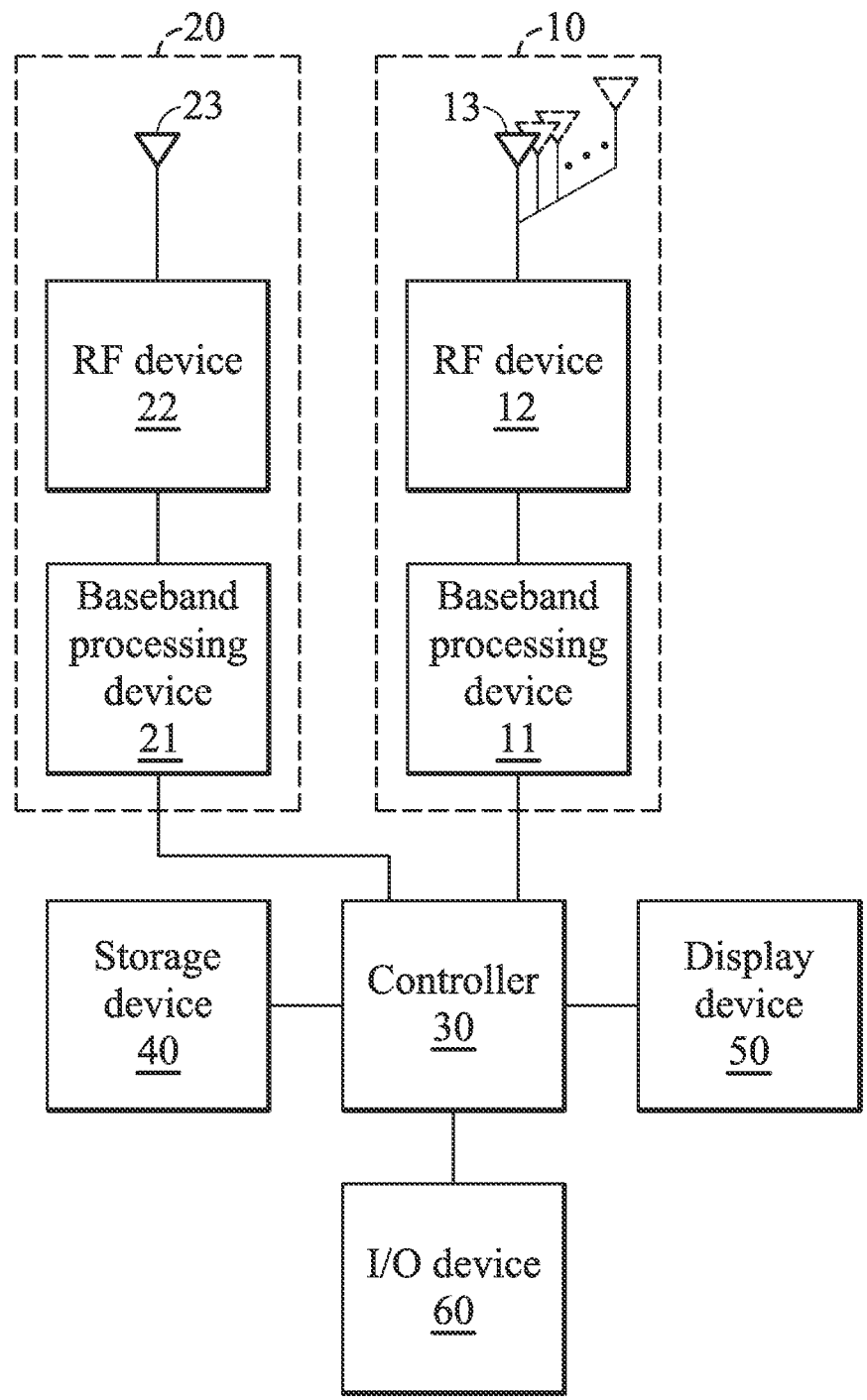
FIG. 2 is a block diagram illustrating a UE according to an embodiment of the application.

FIG. 2 is a block diagram illustrating a UE according to an embodiment of the application.

As shown in FIG. 2, the UE may include two wireless transceivers 10 and 20, a controller 30, a storage device 40, a display device 50, and an Input/Output (I/O) device 60.

The wireless transceiver 10 is configured to perform wireless transmission and reception to and from the 3GPP access 120.

Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between a Universal Integrated Circuit Card (UICC) (not shown) and the RF device 12. In one embodiment, the UICC may be a Subscriber Identity Module (SIM) card or a Universal SIM (USIM) card, and may be inserted into a socket of the UE. In another embodiment, the UICC may be a virtual SIM/USIM or soft SIM/USIM, and may be embedded inside the UE (e.g., may be written into the storage device 40). The baseband processing device 11 may contain multiple hardware components, such as a baseband processor, to perform the baseband signal processing, such as Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported RATs, wherein the radio frequency may be 900 MHz, 1800 MHz or 1900 MHz utilized in GSM/EDGE/GPRS systems, or may be 900 MHz, 1900 MHz or 2100 MHz utilized in WCDMA systems, or may be 900 MHz, 2100 MHz, or 2.6 GHz utilized in LTE/LTE-A/TD-LTE systems, or any radio frequency (e.g., sub-6 GHz, 24.25 GHz-52.6 GHz for mmWave) utilized in 5G (e.g., NR) systems, or another radio frequency, depending on the RAT in use.

The wireless transceiver 20 is configured to perform wireless transmission and reception to and from the non-3GPP access 130. In one embodiment, the wireless transceiver 20 may be realized as a Wi-Fi chip if the RAT utilized by the non-3GPP access 130 is the Wi-Fi technology.

Specifically, the wireless transceiver 20 may include a baseband processing device 21, an RF device 22, and an antenna 23. In one example, the antenna 23 may also include an antenna array for beamforming if the supported Wi-Fi version is 802.11ac or any advanced version that supports beamforming technique.

The baseband processing device 21 is configured to perform baseband signal processing. The baseband processing device 21 may contain multiple hardware components, such as a baseband processor, to perform the baseband signal processing, such as ADC/DAC, gain adjusting, modulation/demodulation, encoding/decoding, and so on.

The RF device 22 may receive RF wireless signals via the antenna 23, convert the received RF wireless signals to baseband signals, which are processed by the baseband processing device 21, or receive baseband signals from the baseband processing device 21 and convert the received baseband signals to RF wireless signals, which are later transmitted via the antenna 23. The RF device 22 may also contain multiple hardware devices to perform radio frequency conversion. For example, the RF device 22 may include a mixer to multiply the baseband signals with a carrier oscillated in the radio frequency of the supported RATs, wherein the radio frequency may be 2.4 GHz or 5 GHz utilized in Wi-Fi systems, or may be 2.402~2.480 GHz utilized in BT systems, or another radio frequency, depending on the RAT in use.

In another embodiment, the wireless transceivers 10 and 20 may be incorporated into a single wireless transceiver. That is, the single wireless transceiver may include a combo RF device to support wireless transceiving to and from the 3GPP access 120 and the non-3GPP access 130, and a combo baseband processor (also called a baseband modem) to take care of the signaling tasks compliant with the standards of the RATs utilized by the 3GPP access 120 and the non-3GPP access 130.

The controller 30 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the 3GPP access 120, controlling the wireless transceiver 20 for wireless communications with the non-3GPP access 130, storing and retrieving data (e.g., program code and/or forbidden PLMN list (for non-3GPP access to 5GCN)) to and from the storage device 40, sending a series of frame data (e.g. representing text messages, graphics, images, etc.) to the display device 50, and receiving user inputs or outputting signals via the I/O device 60.

In particular, the controller 30 coordinates the aforementioned operations of the wireless transceivers 10 and 20, the storage device 40, the display device 50, and the I/O device 60 for performing the methods of the present application.

In another embodiment, the controller 30 may be incorporated into the baseband processing device 11 or the baseband processing device 21, to serve as a baseband processor.

As will be appreciated by persons skilled in the art, the circuits of the controller 30 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 40 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., the forbidden PLMN list (for non-3GPP access to 5GCN)), instructions, and/or program code of applications, communication protocols (e.g., a Wi-Fi protocol, and/or a 5G protocol, etc.), and/or the method of the present application. In one example, the method of the present application may be implemented as part of a 5G protocol. A 5G protocol stack generally include a Non-Access-Stratum (NAS) layer to communicate with an AMF/SMF/MME entity in the 3GPP core network, and an Access Stratum (AS) layer consisting of multiple sublayers, such as a Radio Resource Control (RRC) sublayer for high layer configuration and control of, a Packet Data Convergence Protocol/Radio Link Control (PDCP/RLC) sublayer, a Media Access Control (MAC) sublayer, and a Physical (PHY) sublayer.

The display device 50 may be a Liquid-Crystal Display (LCD), a Light-Emitting Diode (LED) display, an Organic LED (OLED) display, or an Electronic Paper Display (EPD), etc., for providing a display function. Alternatively, the display device 50 may further include one or more touch sensors for sensing touches, contacts, or approximations of objects, such as fingers or styluses.

The I/O device 60 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, the UE may include more components, such as a power supply (e.g., a mobile/replaceable battery) for powering other components of the UE, and/or a Global Positioning System (GPS) device for use of some location-based services or applications, etc. Alternatively, the UE may include fewer components. For example, the UE may not include the display device 50 and/or the I/O device 60.

Figure 3:
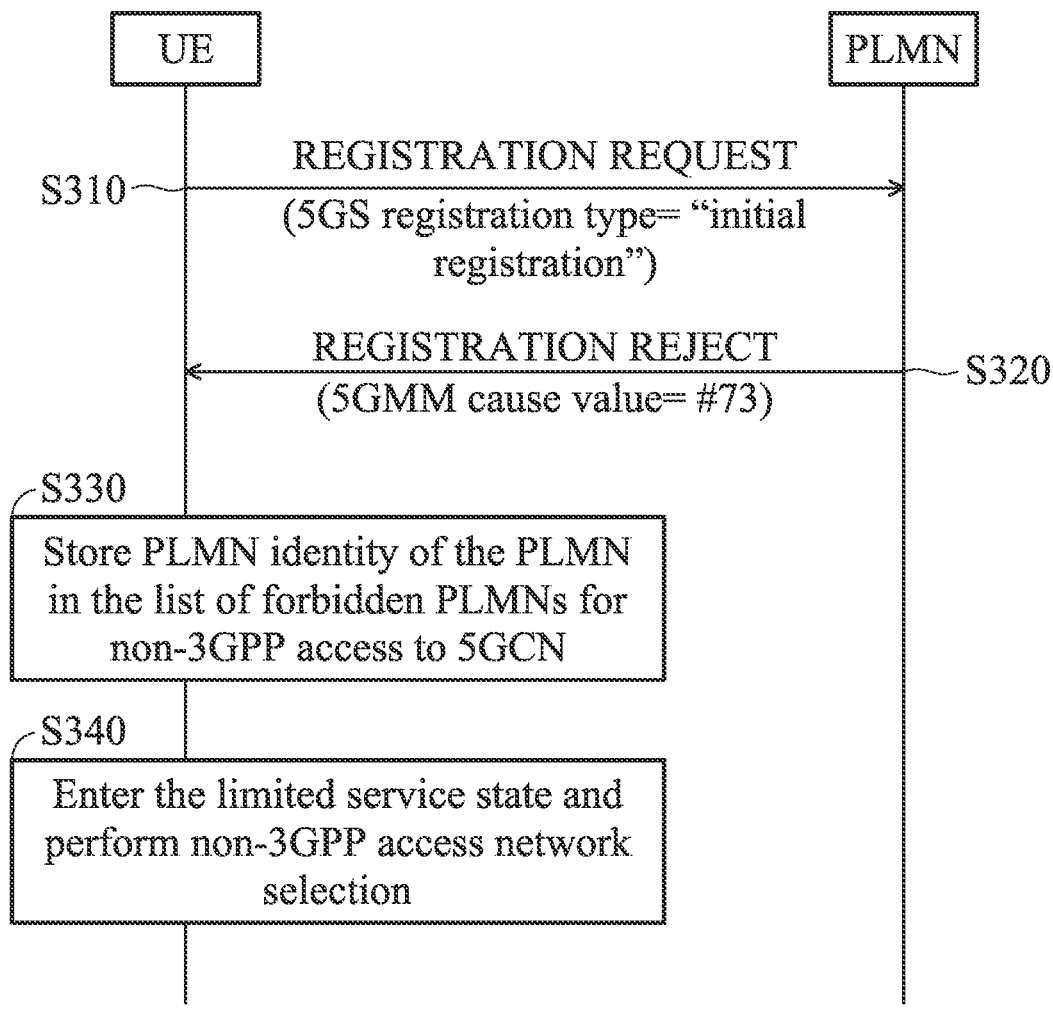
FIG. 3 is an exemplary message sequence chart illustrating UE handling in a limited service state over non-3GPP access according to an embodiment of the application.

FIG. 3 is an exemplary message sequence chart illustrating UE handling in a limited service state over non-3GPP access according to an embodiment of the application.

In this embodiment, the UE handling is related to an initial registration which is not accepted by the network.

In step S310, the UE sends a REGISTRATION REQUEST message to a PLMN over non-3GPP access. The REGISTRATION REQUEST may include a 5G System (5GS) registration type indicates initial registration. In one example, the PLMN is a roaming PLMN.

In step S320, the UE receives a REGISTRATION REJECT message from the PLMN over non-3GPP access. Specifically, the REGISTRATION REJECT message may include a 5G Mobility Management (5GMM) cause value #73 "Serving network not authorized".

The 5GMM cause value #73 is sent to the UE if the UE initiates registration towards a serving network and the serving network fails to be authorized by the UE's home network.

In step S330, the UE stores the PLMN identity of the PLMN in the list of forbidden PLMNs for non-3GPP access to 5GCN (i.e., the forbidden PLMN list for non-3GPP access to 5GCN).

In step S340, the UE enters the limited service state and performs network selection as defined in 3GPP TS 24.502 (i.e., non-3GPP access network selection). Specifically, the limited service state is a state (e.g., 5GMM-DEREGISTERED.LIMITED-SERVICE) in which the UE is able to perform the non-3GPP access network selection, and the non-3GPP access network selection is performed using the updated forbidden PLMN list.

The non-3GPP access network selection may be a PLMN selection procedure using trusted non-3GPP access, or a PLMN selection procedure using wireline access, or a Non-3GPP Access Network (N3AN) node selection procedure.

Figure 4:
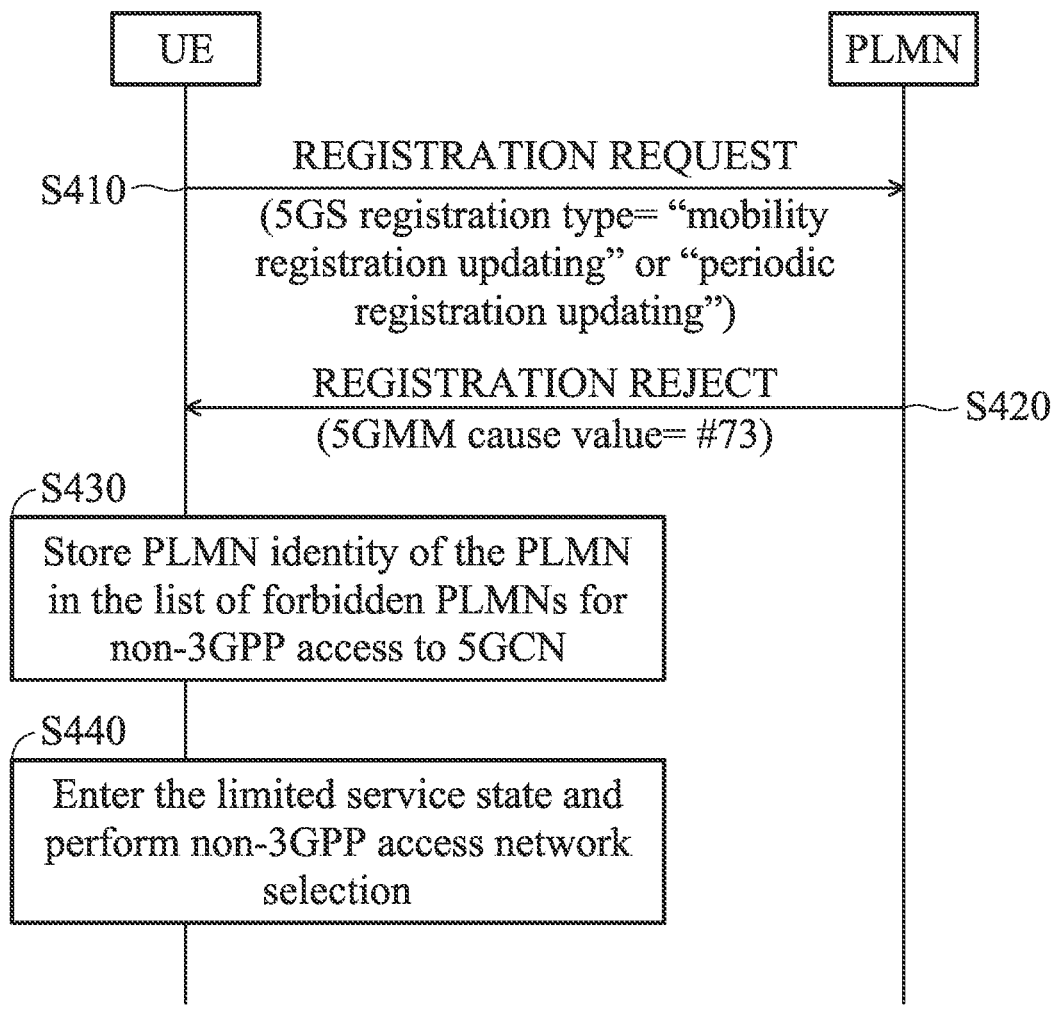
FIG. 4 is an exemplary message sequence chart illustrating UE handling in a limited service state over non-3GPP access according to another embodiment of the application.

FIG. 4 is an exemplary message sequence chart illustrating UE handling in a limited service state over non-3GPP access according to another embodiment of the application.

In this embodiment, the UE handling is related to a mobility registration update or a periodic registration update which is not accepted by the network.

In step S410, the UE sends a REGISTRATION REQUEST message to a PLMN over non-3GPP access. The REGISTRATION REQUEST may include a 5GS registration type indicates mobility registration updating or periodic registration updating. In one example, the PLMN is a roaming PLMN.

In step S420, the UE receives a REGISTRATION REJECT message from the PLMN over non-3GPP access. Specifically, the REGISTRATION REJECT message may include a 5GMM cause value #73 "Serving network not authorized".

The 5GMM cause value #73 is sent to the UE if the UE initiates registration towards a serving network and the serving network fails to be authorized by the UE's home network.

In step S430, the UE stores the PLMN identity of the PLMN in the list of forbidden PLMNs for non-3GPP access to 5GCN (i.e., the forbidden PLMN list for non-3GPP access to 5GCN).

In step S440, the UE enters the limited service state and performs network selection as defined in 3GPP TS 24.502 (i.e., non-3GPP access network selection). Specifically, the limited service state is a state (e.g., 5GMM-DEREGISTERED.LIMITED-SERVICE) in which the UE is able to perform the non-3GPP access network selection, and the non-3GPP access network selection is performed using the updated forbidden PLMN list.

The non-3GPP access network selection may be a PLMN selection procedure using trusted non-3GPP access, or a PLMN selection procedure using wireline access, or a N3AN node selection procedure.

Figure 5:
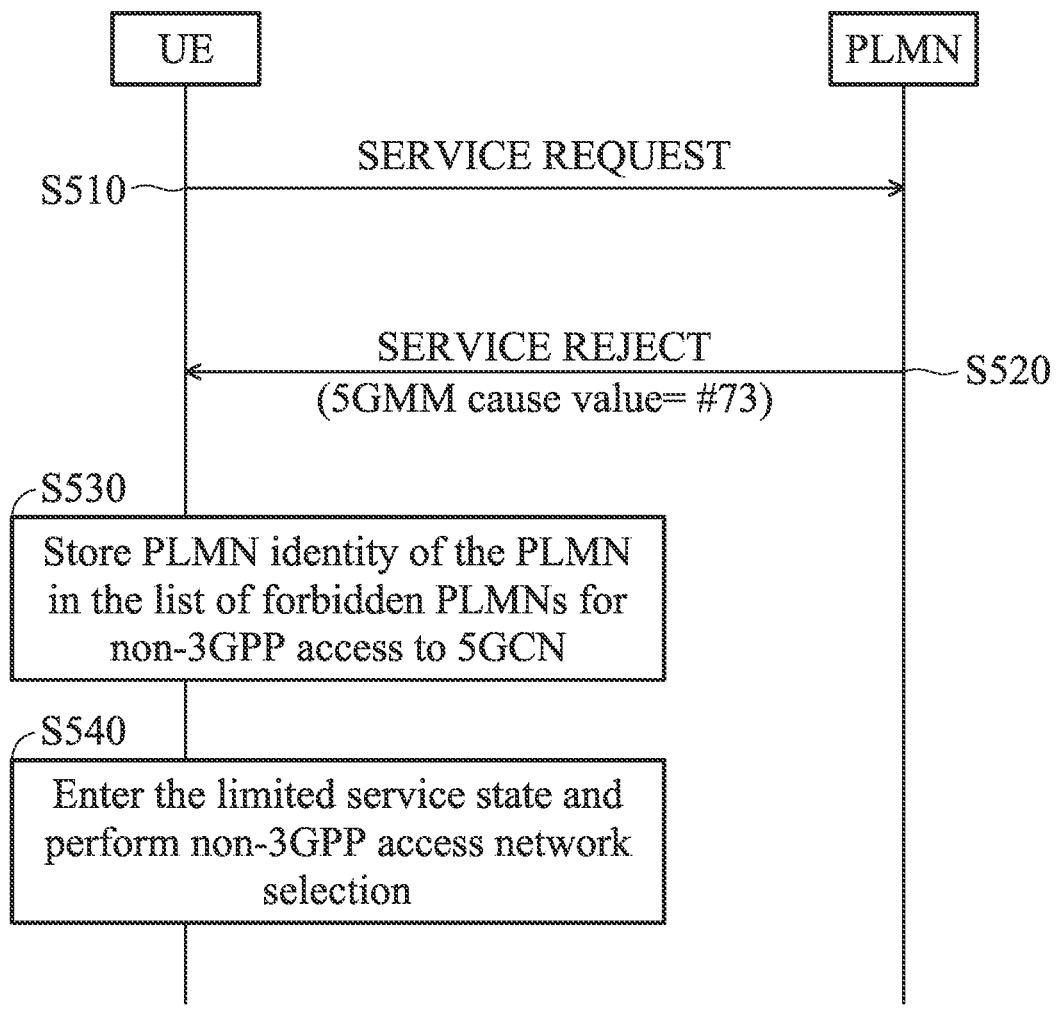
FIG. 5 is an exemplary message sequence chart illustrating UE handling in a limited service state over non-3GPP access according to another embodiment of the application.

FIG. 5 is an exemplary message sequence chart illustrating UE handling in a limited service state over non-3GPP access according to another embodiment of the application.

In this embodiment, the UE handling is related to a service request procedure not accepted by the network.

In step S510, the UE sends a SERVICE REQUEST message to a PLMN over non-3GPP access. The SERVICE REQUEST may include a service type which is used to specify the purpose of the service request procedure. For example, the service type may indicate "signaling", "data", "mobile terminated services", "emergency services", "emergency services fallback", "high priority access", or "elevated signaling". In one example, the PLMN is a roaming PLMN.

In step S520, the UE receives a SERVICE REJECT message from the PLMN over non-3GPP access. Specifically, the SERVICE REJECT message may include a 5GMM cause value #73 "Serving network not authorized".

The 5GMM cause value #73 is sent to the UE if the UE initiates registration towards a serving network and the serving network fails to be authorized by the UE's home network.

In step S530, the UE stores the PLMN identity of the PLMN in the list of forbidden PLMNs for non-3GPP access to 5GCN (i.e., the forbidden PLMN list for non-3GPP access to 5GCN).

In step S540, the UE enters the limited service state and performs network selection as defined in 3GPP TS 24.502 (i.e., non-3GPP access network selection). Specifically, the limited service state is a state (e.g., 5GMM-DEREGISTERED.LIMITED-SERVICE) in which the UE is able to perform the non-3GPP access network selection, and the non-3GPP access network selection is performed using the updated forbidden PLMN list.

The non-3GPP access network selection may be a PLMN selection procedure using trusted non-3GPP access, or a PLMN selection procedure using wireline access, or a N3AN node selection procedure.

Figure 6:
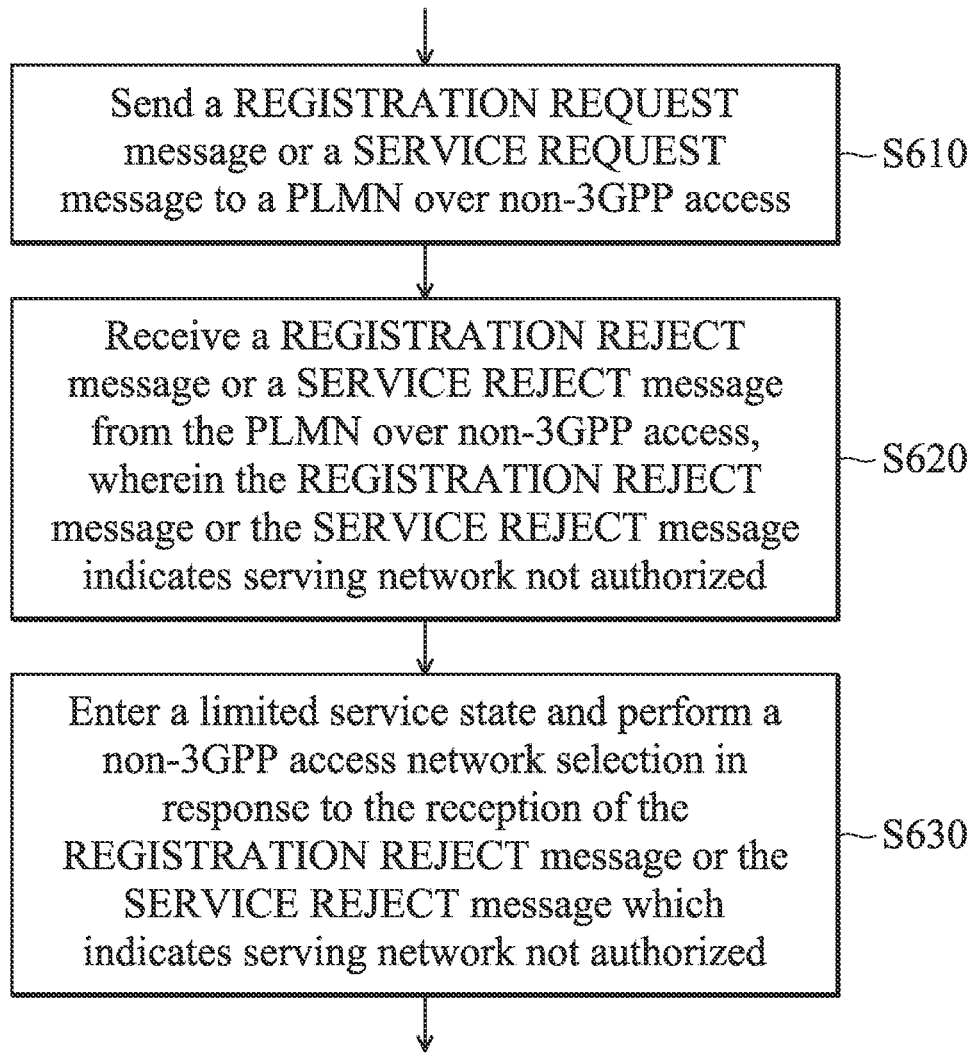
FIG. 6 is a flow chart illustrating the method for enhancing UE handling in a limited service state over non-3GPP access according to an embodiment of the application.

FIG. 6 is a flow chart illustrating the method for enhancing UE handling in a limited service state over non-3GPP access according to an embodiment of the application.

The method for enhancing UE handling in a limited service state over non-3GPP access may be applied to and executed by a UE (e.g., the UE 110) which supports accessing a PLMN over non-3GPP access.

In step S610, the UE sends a REGISTRATION REQUEST message or a SERVICE REQUEST message to a PLMN over non-3GPP access. In one example, the PLMN is a roaming PLMN. In one example, the REGISTRATION REQUEST includes a 5GS registration type indicates initial registration, mobility registration updating, or periodic registration updating.

In step S620, the UE receives a REGISTRATION REJECT message or a SERVICE REJECT message from the PLMN over non-3GPP access, wherein the REGISTRATION REJECT message or the SERVICE REJECT message indicates serving network not authorized. In one example, the REGISTRATION REJECT message or the SERVICE REJECT message includes a 5GMM cause value (e.g., 73) indicating serving network not authorized. In another embodiment, the UE may not send a message in step S610 and the UE receives a DEREGISTRATION REQUEST includes a 5GMM cause value (e.g., 73) indicating serving network not authorized in step S620.

In step S630, the UE enters a limited service state and performs a non-3GPP access network selection in response to the reception of the REGISTRATION REJECT message or the SERVICE REJECT message which indicates serving network not authorized. In one example, the limited service state is a 5GMM-DEREGISTERED.LIMITED-SERVICE state in which the UE is able to perform the non-3GPP access network selection. The non-3GPP access network selection is a PLMN selection procedure using trusted non-3GPP access, or a PLMN selection procedure using wireline access, or a N3AN node selection procedure.

In another embodiment, in response to the reception of the REGISTRATION REJECT message or the SERVICE REJECT message which indicates serving network not authorized, the UE may update a forbidden PLMN list by storing the PLMN identity of the PLMN in the forbidden PLMN list which is a list of forbidden PLMNs for non-3GPP access to 5GCN, and the non-3GPP access network selection may be performed using the updated forbidden PLMN list.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A method, executed by a User Equipment (UE), comprising:
    sending a REGISTRATION REQUEST message or a SERVICE REQUEST message to a Public Land Mobile Network (PLMN) over non-Third Generation Partnership Project (3GPP) access;
    receiving a REGISTRATION REJECT message or a SERVICE REJECT message from the PLMN over non-3GPP access, wherein the REGISTRATION REJECT message or the SERVICE REJECT message indicates serving network not authorized; and
    entering a limited service state and performing a non-3GPP access network selection in response to the reception of the REGISTRATION REJECT message or the SERVICE REJECT message which indicates serving network not authorized;
    wherein the REGISTRATION REJECT message or the SERVICE REJECT message comprises a 5G Mobility Management (5GMM) cause value indicating serving network not authorized, and the 5GMM cause value is 73.

2. The method as claimed in claim 1, wherein the limited service state is a 5GMM-DEREGISTERED.LIMITED-SERVICE state in which the UE is able to perform the non-3GPP access network selection.

3. The method as claimed in claim 1, wherein the non-3GPP access network selection is a PLMN selection procedure using trusted non-3GPP access, or a PLMN selection procedure using wireline access, or a Non-3GPP Access Network (N3AN) node selection procedure.

4. The method as claimed in claim 1, further comprising:
    updating a forbidden PLMN list by storing a PLMN identity of the PLMN in the forbidden PLMN list which is a list of forbidden PLMNs for non-3GPP access to 5G Core Network (CN).

5. The method as claimed in claim 4, wherein the non-3GPP access network selection is performed using the updated forbidden PLMN list.

6. The method as claimed in claim 1, wherein the PLMN is a roaming PLMN.

7. The method as claimed in claim 1, wherein the REGISTRATION REQUEST comprises a 5G System (5GS)

registration type indicates initial registration, mobility registration updating, or periodic registration updating.

8. A User Equipment (UE), comprising:
a wireless transceiver, configured to perform wireless transmission and reception to and from a Public Land Mobile Network (PLMN) over non-Third Generation Partnership Project (3GPP) access; and
a controller, coupled to the wireless transceiver, and configured to perform the following using the wireless transceiver:
sending a REGISTRATION REQUEST message or a SERVICE REQUEST message to the PLMN over non-3GPP access;
receiving a REGISTRATION REJECT message or a SERVICE REJECT message from the PLMN over non-3GPP access, wherein the REGISTRATION REJECT message or the SERVICE REJECT message indicates serving network not authorized; and
entering a limited service state and performing a non-3GPP access network selection in response to the reception of the REGISTRATION REJECT message or the SERVICE REJECT message which indicates serving network not authorized;
wherein the REGISTRATION REJECT message or the SERVICE REJECT message comprises a 5G Mobility Management (5GMM) cause value indicating serving network not authorized, and the 5GMM cause value is 73.

9. The UE as claimed in claim 8, wherein the limited service state is a 5GMM-DEREGISTERED.LIMITED-SERVICE state in which the UE is able to perform the non-3GPP access network selection.

10. The UE as claimed in claim 8, wherein the non-3GPP access network selection is a PLMN selection procedure using trusted non-3GPP access, or a PLMN selection procedure using wireline access, or a Non-3GPP Access Network (N3AN) node selection procedure.

11. The UE as claimed in claim 8, wherein the controller is further configured to update a forbidden PLMN list by storing a PLMN identity of the PLMN in the forbidden PLMN list which is a list of forbidden PLMNs for non-3GPP access to 5G Core Network (CN).

12. The UE as claimed in claim 11, wherein the non-3GPP access network selection is performed using the updated forbidden PLMN list.

13. The UE as claimed in claim 8, wherein the PLMN is a roaming PLMN.

14. The UE as claimed in claim 8, wherein the REGISTRATION REQUEST comprises a 5G System (5GS) registration type indicates initial registration, mobility registration updating, or periodic registration updating.

* * * * *